US012566820B2

(12) United States Patent
Li et al.

(10) Patent No.: US 12,566,820 B2
(45) Date of Patent: Mar. 3, 2026

(54) METHOD AND APPARATUS FOR CLASSIFYING DATA

(71) Applicant: Siemens Mobility GmbH, Bayern (DE)

(72) Inventors: Cong Chao Li, Suzhou (CN); Chang Wei Loh, Suzhou (CN); Chao Hua Wu, Beijing (CN); Xiao Nan Liu, Suzhou (CN); Hao Tian Hui, Suzhou (CN); Lei Lu, Suzhou (CN)

(73) Assignee: Siemens Mobility GmbH, Munich (DE)

( * ) Notice: Subject to any disclaimer, the term of this patent is extended or adjusted under 35 U.S.C. 154(b) by 1261 days.

(21) Appl. No.: 17/296,638

(22) PCT Filed: Dec. 3, 2018

(86) PCT No.: PCT/CN2018/118884
§ 371 (c)(1),
(2) Date: May 25, 2021

(87) PCT Pub. No.: WO2020/113363
PCT Pub. Date: Jun. 11, 2020

(65) Prior Publication Data
US 2022/0027681 A1     Jan. 27, 2022

(51) Int. Cl.
*G06N 3/08*          (2023.01)
*G06F 18/23*         (2023.01)
(Continued)

(52) U.S. Cl.
CPC ............ *G06F 18/241* (2023.01); *G06F 18/23* (2023.01); *G06F 18/25* (2023.01); *G06N 3/045* (2023.01); *G06N 3/08* (2013.01); *G06V 10/751* (2022.01)

(58) Field of Classification Search
CPC ........ G06F 18/241; G06F 18/25; G06F 18/23; G06V 10/751; G06N 3/045; G06N 3/08
See application file for complete search history.

(56) References Cited

U.S. PATENT DOCUMENTS

2009/0132594 A1     5/2009  Syeda-Mahmood et al.
2015/0302081 A1*  10/2015  Denney ................. G06F 16/444
                                                            707/737

FOREIGN PATENT DOCUMENTS

CN          102253996 A      11/2011
CN          106096052 A      11/2016
                 (Continued)

OTHER PUBLICATIONS

Kamiran, Faisal, Asim Karim, and Xiangliang Zhang. "Decision theory for discrimination-aware classification." In 2012 IEEE 12th international conference on data mining, pp. 924-929. IEEE, 2012. (Year: 2012).*
(Continued)

*Primary Examiner* — Casey R. Garner
(74) *Attorney, Agent, or Firm* — Harness, Dickey & Pierce, P.L.C.

(57)                    ABSTRACT
A method and an apparatus are for classifying data. In an embodiment, the method includes: classifying at least two pieces of data, to obtain at least two data clusters; determining a bias degree of classification; re-classifying the at least two pieces of data by merging any several of the at least two data clusters; determining a bias degree of re-classification; and determining, by comparing the bias degree of first classification and the bias degree of re-classification, which classification is more accurate. By way of the method and apparatus, a related data cluster can be found from multiple data clusters for better data analysis.

20 Claims, 4 Drawing Sheets

(51) Int. Cl.
*G06F 18/241* (2023.01)
*G06F 18/25* (2023.01)
*G06N 3/045* (2023.01)
*G06V 10/75* (2022.01)

(56) References Cited

FOREIGN PATENT DOCUMENTS

| | | | |
|---|---|---|---|
| CN | 107563450 A | 1/2018 |
| CN | 108268526 A | 7/2018 |

OTHER PUBLICATIONS

López-Soto, Diana et al: "Root cause analysis of familiarity biases in clasification of inventory items based on logical pattrns recognition"; Computers & Industrial Engineering, Pergamon, Amsterdam, NL; vol. 93, Dec. 21, 2015 (Dec. 21, 2015), pp. 121-130, XP029420961.
International Search Report for International Application No. PCT/CN2018/118884 dated Aug. 27, 2019.
Written Opinion for International Application No. PCT/CN2018/118884 dated Aug. 27, 2019.
Anonymous: "http://web.archive.org/web/20170818080800/https://www.merriam-webster.com/dictionary/industry", Merriam-Webster Dictionary, Aug. 18, 2017, pp. 1-5, XP093078103, retrieved from the Internet: http://web.archive.org/web/20170818080800/ https://www.merriam-webster.com/dictionary/industry;.

* cited by examiner

1

METHOD AND APPARATUS FOR CLASSIFYING DATA

PRIORITY STATEMENT

This application is the national phase under 35 U.S.C. § 371 of PCT International Application No. PCT/CN2018/118884 which has an International filing date of Dec. 3, 2018, the entire contents of each of which are hereby incorporated herein by reference.

FIELD

The disclosure generally relates to the field of machine learning, and in particular, to a method and an apparatus for classifying data.

BACKGROUND

An industrial system produces many different types of data during operation. When an operation condition of the industrial system is analyzed, people first use a clustering method to cluster data produced by the industrial system to obtain many data clusters, and then perform analysis based on these data clusters to find out real reasons of various situations occurring in the industrial system.

In an existing clustering method, data is roughly grouped by using some types of distances and densities of adjacent data, to obtain multiple data clusters, and a relationship between these data clusters cannot be provided. However, in many cases, some of these data clusters are related. In addition, real reasons of some special situations that sometimes occur in the industrial system are hidden in these related data clusters.

Because the existing clustering method cannot provide the relationship between the data clusters obtained through clustering, which data clusters are related cannot be learned of according to the existing clustering method. Therefore, real reasons of some special situations occurring in the industrial system cannot be learned of, and data analysis cannot be better performed.

SUMMARY

Considering the foregoing problem of the prior art, embodiments of the present invention provide a method and an apparatus for classifying data, so as to find out a related data cluster from multiple data clusters for better data analysis.

The method for classifying data according to an embodiment of the present invention includes: classifying at least two pieces of data, to obtain at least two data clusters; determining a bias degree of classification; re-classifying the at least two pieces of data by merging any several of the at least two data clusters; determining a bias degree of re-classification; and determining, by comparing the bias degree of first classification and the bias degree of re-classification, which classification is more accurate.

The apparatus for classifying data according to an embodiment of the present invention includes: a first classification module, configured to classify at least two pieces of data, to obtain at least two data clusters; a first determining module, configured to determine a bias degree of classification; a second classification module, configured to re-classify the at least two pieces of data by merging any several of the at least two data clusters; a second determining module, configured to determine a bias degree of re-classification; and a third determining module, configured to, determine, by comparing the bias degree of first classification and the bias degree of re-classification, which classification is more accurate.

A computation device according to an embodiment of the present invention includes: at least one processor; and at least one memory, configured to store an executable instruction, causing the at least one processor to perform an embodiment of the method when the executable instruction is executed.

In a machine readable storage medium according to an embodiment of the present invention, an executable instruction is stored on the machine readable storage medium, and causes a processor to perform an embodiment of the method when the executable instruction is executed.

In a computer program product according to an embodiment of the present invention, the computer program product is tangibly stored on a computer readable medium and includes a computer executable instruction, causing at least one processor to perform an embodiment of the method when the computer executable instruction is executed.

A computer program according to an embodiment of the present invention includes a computer executable instruction, causing at least one processor to perform an embodiment of the method when the computer executable instruction is executed.

BRIEF DESCRIPTION OF THE DRAWINGS

Other features, characteristics, advantages, and benefits of the present invention will become more obvious by using the following detailed descriptions in combination with the accompanying drawings.

REFERENCE NUMERALS OF THE DRAWINGS

Figure 1:
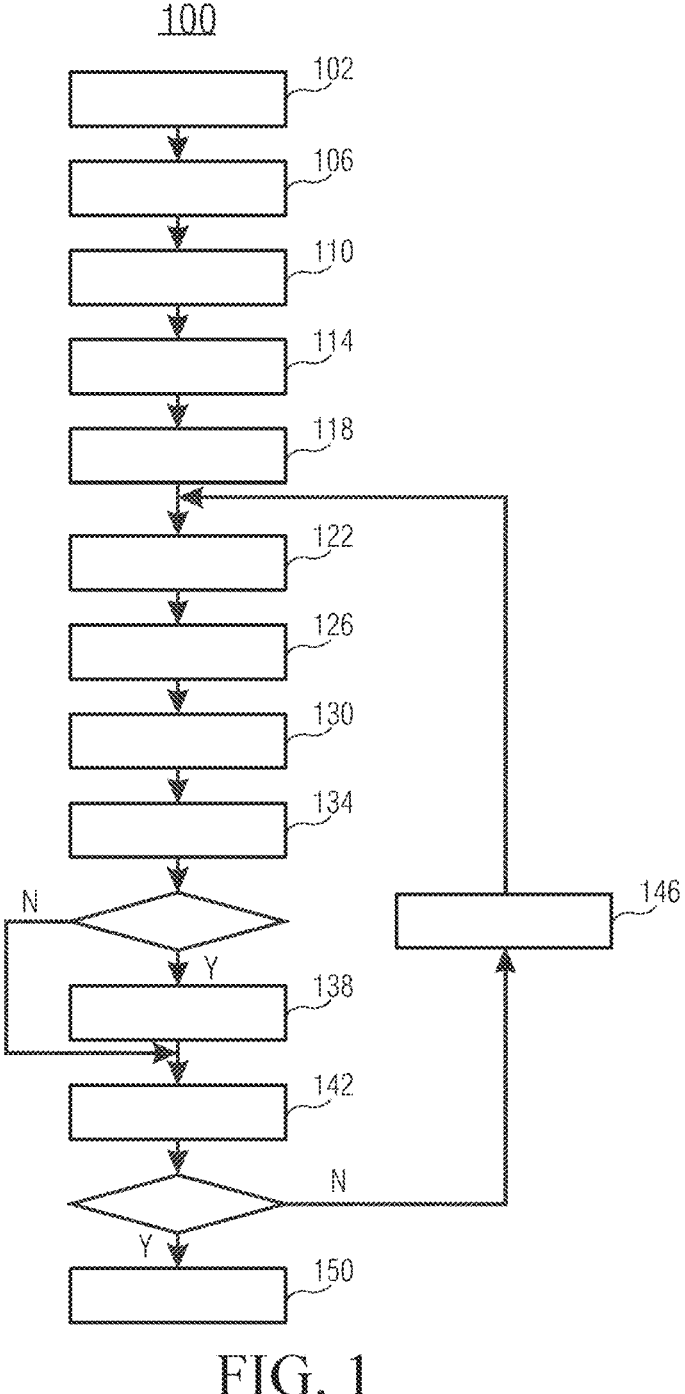
FIG. 1 is an overall flowchart of a method for classifying data according to an embodiment of the present invention.

| | |
|---|---|
| 100: Method for classifying data | 102: Cluster data |
| 106: Train an auto encoder | 110: Obtain first prediction data for a data cluster |
| 114: Calculate a first information entropy of the data cluster | 118: Select a data cluster |
| 122: Train an auto encoder | 126: Obtain second prediction data for the data cluster |
| 130: Calculate a second information entropy of the data cluster | 134: Determine whether the data cluster is related |
| 138: Mark the data cluster as related | 142: Determine whether a test is completed |
| 146: Select a data cluster | 150: Merge data clusters |

-continued

| | |
|---|---|
| 200: Method for classifying data | 202: Perform first classification |
| 206: Perform re-classification | 208: Determine a bias degree of re-classification |
| 210: Determine which classification is more accurate | 300: Apparatus for classifying data |
| 302: First classification module | 304: First determining module |
| 306: Second classification module | 308: Second determining module |
| 310: Third determining module | 400: Computation device |
| 402: At least one processor | 404: At least one memory |

DETAILED DESCRIPTION OF THE EXAMPLE EMBODIMENTS

The method for classifying data according to an embodiment of the present invention includes: classifying at least two pieces of data, to obtain at least two data clusters; determining a bias degree of classification; re-classifying the at least two pieces of data by merging any several of the at least two data clusters; determining a bias degree of re-classification; and determining, by comparing the bias degree of first classification and the bias degree of re-classification, which classification is more accurate.

According to a first aspect of an embodiment, the determining a bias degree of classification includes: calculating respective first bias estimations of the at least two data clusters, where a first bias estimation of any data cluster of the at least two data clusters indicates a difference degree between the any data cluster and output data of a first neural network model of the any data cluster when the any data cluster is input to the first neural network model of the any data cluster, the first neural network model of the any data cluster is obtained through training by using data included in the any data cluster, and an input layer and an output layer of the first neural network model have the same quantity of nodes; the determining a bias degree of re-classification includes: for any several data clusters selected from the at least two data clusters, calculating respective second bias estimations of the any several data clusters, where a second bias estimation of each data cluster in the any several data clusters indicates a difference degree between the data cluster and output data of a particular neural network model when the data cluster is input to the particular neural network model, the particular neural network model is obtained through training by using all data included in the any several data clusters, and an input layer and an output layer of the particular neural network model have the same quantity of nodes; and the determining which classification is more accurate includes: determining, based on respective first bias estimations and second bias estimations of the any several data clusters, whether the any several data clusters are related, and marking the any several data clusters as related when a determining result is positive. Herein, after the at least two pieces of data to be classified are classified to obtain the at least two data clusters, a neural network model is used to detect the data clusters to see whether there is a related data cluster in the data clusters and mark the related data cluster as related, so as to find out the related data cluster in the multiple data clusters. Cluster related calculation helps search for an internal hidden link between clusters and avoids performing separate independent analysis on related data and ignoring an internal link between data of different clusters, causing that an analysis result based on these internal links cannot be obtained.

According to a second aspect of an embodiment, the determining whether the any several data clusters are related includes: determining that the any several data clusters are related if a second bias estimation of each data cluster in the any several data clusters is less than a first bias estimation of the data cluster. Herein, whether the any several data clusters are related is determined merely based on a relationship between the second bias estimation of each data cluster in the any several data clusters and the first bias estimation of the data cluster, so that whether the data clusters are related can be simply and fast determined.

According to a third aspect of an embodiment, the method further includes: merging data clusters marked as related in the at least two data clusters into a data cluster. Herein, the data clusters marked as related are merged into a data cluster in advance, so that the data cluster is fast obtained in subsequent operations for analysis, and the quantity of clusters is reduced, thereby reducing a computation amount of subsequent data processing.

According to a fourth aspect of an embodiment, respective first neural network models of the at least two data clusters and the particular neural network model are neural network models of the same type. Herein, the respective first neural network models of the at least two data clusters and the particular neural network model are set to the same type, to improve detection accuracy of the related data clusters and unify the models. In this way, the classification method provided in this embodiment of the present invention and an original result obtained merely by means of a clustering method can be accurately compared and described.

The apparatus for classifying data according to an embodiment of the present invention includes: a first classification module, configured to classify at least two pieces of data, to obtain at least two data clusters; a first determining module, configured to determine a bias degree of classification; a second classification module, configured to re-classify the at least two pieces of data by merging any several of the at least two data clusters; a second determining module, configured to determine a bias degree of re-classification; and a third determining module, configured to, determine, by comparing the bias degree of first classification and the bias degree of re-classification, which classification is more accurate.

According to a first aspect of an embodiment, the first determining module is further configured to calculate respective first bias estimations of the at least two data clusters, where a first bias estimation of any data cluster of the at least two data clusters indicates a difference degree between the any data cluster and output data of a first neural network model of the any data cluster when the any data cluster is input to the first neural network model of the any data cluster, the first neural network model of the any data cluster is obtained through training by using data included in the any data cluster, and an input layer and an output layer of the first neural network model have the same quantity of nodes; the second determining module is further configured to: for any several data clusters selected from the at least two data clusters, calculate respective second bias estimations of the any several data clusters, where a second bias estimation of each data cluster in the any several data clusters indicates a difference degree between the data cluster and output data of a particular neural network model when the data cluster is input to the particular neural network model, the particular neural network model is obtained through training by using all data included in the any several data clusters, and an input layer and an output layer of the particular neural network model have the same quantity of nodes; and the third determining module includes: a judgment module, configured to determine, based on respective first bias estimations and second bias estimations of the any several data clusters, whether the any several data clusters are related; and a marking module, configured to mark the any several data clusters as related when a determining result is positive. Herein, after the at least two pieces of data to be classified are classified to obtain the at least two data clusters, a neural network model is used to detect the data clusters to see whether there is a related data cluster in the data clusters and mark the related data cluster as related, so as to find out the related data cluster in the multiple data clusters. Cluster related calculation helps search for an internal hidden link between clusters and avoids performing separate independent analysis on related data and ignoring an internal link between data of different clusters, causing that an analysis result based on these internal links cannot be obtained.

According to a second aspect of an embodiment, the judgment module is further configured to determine that the any several data clusters are related if a second bias estimation of each data cluster in the any several data clusters is less than a first bias estimation of the data cluster. Herein, whether the any several data clusters are related is determined merely based on a relationship between the second bias estimation of each data cluster in the any several data clusters and the first bias estimation of the data cluster, so that whether the data clusters are related can be simply and fast determined.

According to a third aspect of an embodiment, the apparatus further includes: a mergence module, configured to merge data clusters marked as related in the at least two data clusters into a data cluster. Herein, the data clusters marked as related are merged into a data cluster in advance, so that the data cluster is fast obtained in subsequent operations for analysis, and the quantity of clusters is reduced, thereby reducing a computation amount of subsequent data processing.

According to a fourth aspect of an embodiment, respective first neural network models of the at least two data clusters and the particular neural network model are neural network models of the same type. Herein, the respective first neural network models of the at least two data clusters and the particular neural network model are set to the same type, to improve detection accuracy of the related data clusters and unify the models. In this way, the classification method provided in this embodiment of the present invention and an original result obtained merely by means of a clustering method can be accurately compared and described.

A computation device according to an embodiment of the present invention includes: at least one processor; and at least one memory, configured to store an executable instruction, causing the at least one processor to perform an embodiment of the method when the executable instruction is executed.

In a machine readable storage medium according to an embodiment of the present invention, an executable instruction is stored on the machine readable storage medium, and causes a processor to perform an embodiment of the method when the executable instruction is executed.

In a computer program product according to an embodiment of the present invention, the computer program product is tangibly stored on a computer readable medium and includes a computer executable instruction, causing at least one processor to perform an embodiment of the method when the computer executable instruction is executed.

A computer program according to an embodiment of the present invention includes a computer executable instruction, causing at least one processor to perform an embodiment of the method when the computer executable instruction is executed.

The subject described in this specification is now described with reference to example implementations. It should be understood that these implementations are described to make a person skilled in the art to better understand and implement the subject described in this specification and not to intend to limit the protection scope, applicability, or examples stated in claims. Functions and arrangements of described elements may be changed without departing from the protection scope of this disclosure. Examples may omit, replace, or add various processes or components according to needs. For example, the described methods may be performed according to sequences different from the described ones, and various steps may be added, omitted, or combined. In addition, features described with respect to some examples may also be combined in other examples.

As used in this specification, a term "include" and variants thereof indicate open terms, and mean "include but is not limited to". A term "based on" indicates "at least partially based on". Terms "one embodiment" and "an embodiment" indicate "at least one embodiment". A term "another embodiment" indicates "at least one other embodiment". Terms "first", "second", and the like may refer to different or same objects. Other definitions may be included below regardless of whether the definitions are explicit or implicit. Unless explicitly indicated in the context, a definition of a term is consistent throughout the specification.

In solutions of embodiments of the present invention, after a conventional clustering method is used to cluster multiple pieces of data to be clustered to obtain multiple data clusters, a neural network model is used to detect a related data cluster from these data clusters. Therefore, in the solutions of the embodiments of the present invention, the related data cluster can be found from the multiple data clusters for better data analysis.

The embodiments of the present invention are described below in detail with reference to the accompanying drawings.

FIG. 1 is an overall flowchart of a method for classifying data according to an embodiment of the present invention. A method 100 shown in FIG. 1 may be implemented by any proper computation device having a computation capability. The computation device may be but not limited to a server, a desktop computer, a laptop computer, a tablet computer, a smartphone, or the like.

As shown in FIG. 1, in a box 102, cluster data. Specifically, an existing clustering method (for example, a k-means algorithm or a Mixture-of-Gaussian (GMM) algorithm) or a clustering method that newly merges later is used to cluster multiple pieces of data to be clustered, to obtain multiple data clusters C. Each data cluster in the multiple data clusters C includes at least one piece of data in the multiple pieces of data to be clustered. The multiple pieces of data to be clustered may be data produced by an industrial system or any other system. The multiple pieces of data to be clustered are also referred to as a data set in some cases. A person skilled in the art understands that each piece of data in the multiple pieces of data to be clustered consists of values of multiple attributes (features).

In a box 106, train an auto encoder. Specifically, data included in each data cluster Ci in the multiple data clusters C is used to train an auto encoder as an auto encoder Ai of the data cluster Ci. That is, each data cluster in the multiple data clusters C has a first auto encoder. An auto encoder is one type of neural network, and an input layer and an output layer of the auto encoder have the same quantity of nodes. In this embodiment, the quantity of nodes of the input layer (or output layer) of the auto encoder is equal to the quantity of attributes (features) that each piece of data included in the multiple data clusters C has.

In a box 110, obtain first prediction data for the data cluster. Specifically, the data included in each data cluster Ci in the multiple data clusters C is separately input to the auto encoder Ai of the data cluster Ci, to obtain corresponding data output by the auto encoder Ai of the data cluster Ci as the first prediction data for the data cluster Ci.

For example, assuming that the data cluster Ci includes five pieces of data S1, S2, S3, S4, and S5, and assuming that the corresponding data output by the auto encoder Ai is S1* when the data S1 is input to the auto encoder Ai, the corresponding data output by the auto encoder Ai is S2* when the data S2 is input to the auto encoder Ai, the corresponding data output by the auto encoder Ai is S3* when the data S3 is input to the auto encoder Ai, the corresponding data output by the auto encoder Ai is S4* when the data S4 is input to the auto encoder Ai, and the corresponding data output by the auto encoder Ai is S5* when the data S5 is input to the auto encoder Ai, the first prediction data for the data cluster Ci is S1*, S2*, S3*, S4*, and S5*. A person skilled in the art understands that because the input layer and the output layer of the auto encoder have the same quantity of nodes, the data S1-S5 and the data S1*-S5* have the same quantity of attributes (or features).

In a box 114, calculate a first information entropy of a data cluster. Specifically, a first information entropy IE1-$i$ of each data cluster Ci in the multiple data clusters C is calculated, and the first information entropy IE1-$i$ indicates a difference degree between the data cluster Ci and the first prediction data for the data cluster Ci.

Herein, the first information entropy IE1-$i$ of the data cluster Ci may be calculated by using any proper manner of representing the difference degree between the data cluster Ci and the first prediction data for the data cluster Ci. For example, back to the foregoing example, (|S1−S1*|+|S2−S2*|+|S3−S3*|+|S4−S4*|+|S5−S5*|)/5 may be calculated as the first information entropy IE1-$i$ of the data cluster Ci, where |a| indicates an absolute value of a. For another example, back to the foregoing example, $$\sqrt{(S1-S1*)^2+(S2-S2*)^2+(S3-S3*)^2+(S4-S4*)^2+(S5-S5*)^2 \big/ 5}$$

may be calculated as the first information entropy IE1-$i$ of the data cluster Ci.

It can be seen from the above that in this embodiment, when the first information entropy of the data cluster Ci is calculated, values of all attributes in each piece of data included in the data cluster Ci and values of all attributes in the first prediction data for the data cluster Ci are all used.

In a box 118, select a data cluster. Specifically, two or more data clusters P are selected from the multiple data clusters C, to compose a test set.

In a box 122, train an auto encoder. Specifically, all data included in the selected data cluster P is used to train an auto encoder K. For example, assuming that the selected data cluster P includes five data clusters, all data included in the five data clusters is used to train the auto encoder K.

In a box 126, obtain second prediction data for the data cluster. Specifically, data included in each data cluster Pj of the selected data cluster P is sequentially input into the auto encoder K, to obtain output data of the auto encoder K as second prediction data for a data cluster Pj.

In a box 130, calculate a second information entropy of the data cluster. Specifically, a second information entropy IE2-$j$ of each data cluster Pj in the selected data cluster P is calculated, and the second information entropy IE2-$j$ indicates a difference degree between the data cluster Pj and the second prediction data for the data cluster Pj. Herein, a calculation manner of the second information entropy IE2-$j$ is the same as that of the first information entropy IE1-$i$.

In a box 134, determine whether the data cluster is related. Specifically, whether the selected data cluster P is related is determined based on whether the second information entropy IE2-$j$ of each data cluster Pj in the selected data cluster P is less than a first information entropy IE1-$j$ of the data cluster Pj. Herein, if the second information entropy IE2-$j$ of each data cluster Pj in the selected data cluster P is less than the first information entropy IE1-$j$ of the data cluster Pj, it indicates that the selected data cluster P is related; otherwise, it indicates that the selected data cluster P is unrelated.

For example, assuming that the selected data cluster P includes three data clusters P1, P2, and P3, the data cluster P1 has a first information entropy IE1-1 and a second information entropy IE2-1, the data cluster P2 has a first information entropy IE1-2 and a second information entropy IE2-2, and the data cluster P3 has a first information entropy IE1-3 and a second information entropy IE2-3, when the second information entropy IE2-1 of the data cluster P1 is less than the first information entropy IE1-1 of the data cluster P1, the second information entropy IE2-2 of the data cluster P2 is less than the first information entropy IE1-2 of the data cluster P2, and the second information entropy IE2-3 of the data cluster P3 is less than the first information entropy IE1-3 of the data cluster P3, it indicates that the selected data cluster P is related. If the second information entropy IE2-1 of the data cluster P1 is not less than the first information entropy IE1-1 of the data cluster P1, and/or the second information entropy IE2-2 of the data cluster P2 is not less than the first information entropy IE1-2 of the data cluster P2, and/or the second information entropy IE2-3 of the data cluster P3 is not less than the first information entropy IE1-3 of the data cluster P3, it indicates that the selected data cluster P is unrelated.

If a determining result of the box 134 is positive (Y), a process goes to a box 138, and if the determining result of the box 134 is negative (N), the process goes to a box 142.

In the box 138, mark the data cluster as related. Specifically, the selected data cluster P is marked as related, and then the process goes to the box 142.

In the box 142, determine whether a test is completed. Specifically, whether there are two or more data clusters in the multiple data clusters C that are still not selected to together compose a test set. Herein, if there are two or more data clusters in the multiple data clusters C that are still not selected to together compose the test set, it indicates that a test is not completed; otherwise, it indicates that the test is completed.

If the determining result of the box 142 is negative (N), the process goes to a box 146, and if the determining result of the box 142 is positive (Y), the process goes to a box 150.

In a box 146, select a data cluster. Specifically, two or more data clusters that are still not selected to together compose the test set are selected from the multiple data clusters C, to compose the test set, and then the process returns to the block 122.

In a box 150, merge data clusters. Specifically, data clusters marked as related in the multiple data clusters C are merged into a data cluster. For example, assuming that data clusters C2, C5, and C8 in the multiple data clusters C are marked as related, and data clusters C15 and C20 are marked as related, data clusters C2, C5, and C8 are merged into a data cluster, and data clusters C15 and C20 are merged into another data cluster.

Other Transformations

A person skilled in the art understands that in the foregoing embodiments, the method 100 includes the box 150 and merging the data clusters marked as related into a data cluster. This helps fast obtain a data cluster for analysis in subsequent operations. However, the present invention is not limited thereto. In some other embodiments of the present invention, the method 100 may not include the box 150 but includes merging the data clusters marked as related into a data cluster during analysis in subsequent operations.

A person skilled in the art understands that in the foregoing embodiments, when the first information entropy of the data cluster Ci is calculated, values of all attributes in each piece of data included in the data cluster Ci and values of all attributes in the first prediction data for the data cluster Ci are all used. However, the present invention is not limited thereto. In some other embodiments of the present invention, when the first information entropy of the data cluster Ci is calculated, values of only some attributes in each piece of data included in the data cluster Ci and values of only some attributes in the first prediction data for the data cluster Ci are used. For example, using an example of calculating $(|S1-S1^*|+|S2-S2^*|+|S3-S3^*|+|S4-S4^*|+|S5-S5^*|)/5$ as the first information entropy of the data cluster Ci mentioned above, assuming that each piece of data in the data S1-S5 and S1*-S5* has five attributes (features) at1, at2, at3, at4, and at5, only values of three attributes at2, at3, and at5 of data are used when the first information entropy of the data cluster Ci is calculated, and values of two other attributes at1 and at4 are not used, $|S1-S1^*|$=|value of at2 of S1−value of at2 of S1*|+|value of at3 of S1−value of at3 of S1*|+|value of at5 of S1−value of at5 of S1*|, and calculation of $|S2-S2|$, $|S3-S3^*|$, $|S4-S4^*|$, and $|S5-S5^*|$ is similar.

When values of only some attributes of each piece of data included in the data cluster Ci and values of only some attributes in the first prediction data for the data cluster Ci are used to calculate the first information entropy of the data cluster Ci, when data included in the data cluster Ci is separately input to the auto encoder Ai of the data cluster Ci to calculate the first prediction data for the data cluster Ci, values of attributes that are not used during calculation of data included in the data cluster Ci need to be first set to zero. For example, back to the foregoing example, values of attributes at1 and at4 of data are not used during calculation. Therefore, values of attributes at1 and at4 in data included in the data cluster Ci need to be first set to zero.

A person skilled in the art understands that in the foregoing embodiments, the information entropy is used to indicate a difference degree between a data cluster and prediction data for the data cluster, to conveniently and fast calculate the difference degree between the data cluster and the prediction data for the data cluster. However, the present invention is not limited thereto. In some other embodiments of the present invention, a bias estimation of another type other than the information entropy may be used to indicate the difference degree between the data cluster and the prediction data for the data cluster.

A person skilled in the art understands that in the foregoing embodiments, the neural network model used when first prediction data and second prediction data for the data cluster are obtained is an auto encoder. Because an input layer and an output layer of the auto encoder naturally have the same quantity of nodes, and it does not cost time to conduct a design so that the input layer and the output layer of the auto encoder have the same quantity of nodes, so as to reduce a detection time. However, the present invention is not limited thereto. In some other embodiments of the present invention, a neural network model of another type (which is, for example, but not limited to a radial basis function (RBF) network, a competitive learning (ART) network, or a self-organizing mapping (SOM) network) other than the auto encoder may also be used when the first prediction data and the second prediction data for the data cluster are obtained. Certainly, in this case, a proper design needs to be conducted so that an input layer and an output layer of the used neural network model have the same quantity of nodes.

A person skilled in the art understands that in the foregoing embodiments, the neural network model of the same type (for example, the auto encoder) is used when the first prediction data and the second prediction data for the data cluster are obtained. This can improves detection accuracy of the related data cluster. However, the present invention is not limited thereto. In some other embodiments of the present invention, a neural network model used when the first prediction data for the data cluster is obtained and a neural network model used when the second prediction data for the data cluster is obtained may be neural network models of different types.

A person skilled in the art understands that in the foregoing embodiments, in the box 102, the multiple data clusters C are obtained by classifying data by using a clustering method. However, the present invention is not limited thereto. In some other embodiments of the present invention, the multiple data clusters C may also be obtained by classifying data by using any other proper method other than the clustering method.

Figure 2:
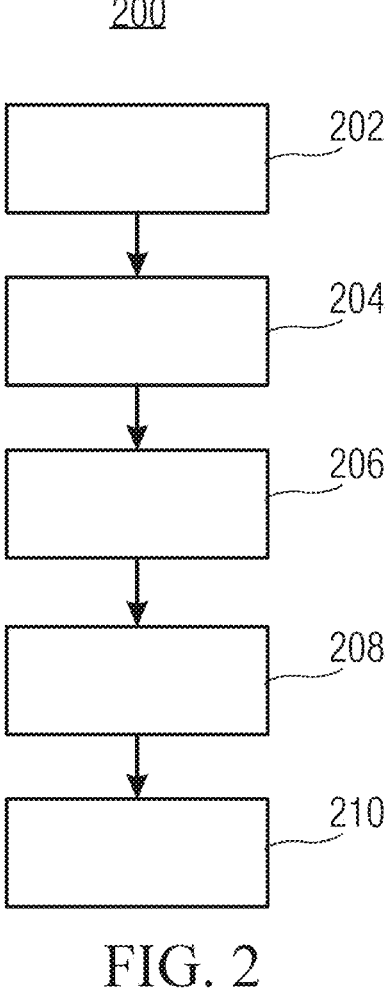
FIG. 2 is a flowchart of a method for classifying data according to an embodiment of the present invention.

FIG. 2 is a flowchart of a method for classifying data according to an embodiment of the present invention. A method 200 shown in FIG. 2 may be implemented by any proper computation device having a computation capability.

As shown in FIG. 2, the method 200 may include: in a box 202, perform first classification, that is, classify at least two pieces of data, to obtain at least two data clusters. An existing clustering method, a clustering method that newly merges later, or any other proper method may be used to implement operations of the box 202.

The method 200 may further include: in a box 204, determine a bias degree of classification.

The method 200 may further include: in a box 206, perform re-classification, that is, re-classify the at least two pieces of data by merging any several of the at least two data clusters.

The method 200 may further include: in a box 208, determine a bias degree of re-classification.

The method 200 may further include: in a box 210, determine which classification is more accurate, that is, determine, by comparing the bias degree of first classification and the bias degree of re-classification, which classification is more accurate.

According to a first aspect, the box 204 includes: calculating respective first bias estimations of the multiple data clusters, where a first bias estimation of any data cluster of the multiple data clusters indicates a difference degree between the any data cluster and output data of a first neural network model of the any data cluster when the any data cluster is input to the first neural network model of the any data cluster, the first neural network model of the any data cluster is obtained through training by using data included in the any data cluster, and an input layer and an output layer of the first neural network model have the same quantity of nodes. The bias estimation may be, for example but not limited to an information entropy. Operations of the box 204 may be implemented by, for example but not limited to, using operations in the boxes 106-114 in FIG. 1 and solutions described in the second and third paragraphs in other transformations. The box 208 includes: for any several data clusters selected from the multiple data clusters, calculating respective second bias estimations of the any several data clusters, where a second bias estimation of each data cluster in the any several data clusters indicates a difference degree between the data cluster and output data of a particular neural network model when the data cluster is input to the particular neural network model, the particular neural network model is obtained through training by using all data included in the any several data clusters, and an input layer and an output layer of the particular neural network model have the same quantity of nodes. Operations of the box 208 may be implemented by, for example but not limited to, using operations in the boxes 122-130 in FIG. 1 and solutions described in the second and third paragraphs in other transformations. The box 210 includes: determining, based on respective first bias estimations and second bias estimations of the any several data clusters, whether the any several data clusters are related, and marking the any several data clusters as related when a determining result is positive. Herein, after the at least two pieces of data to be classified are classified to obtain the at least two data clusters, a neural network model is used to detect the data clusters to see whether there is a related data cluster in the data clusters and mark the related data cluster as related, so as to find out the related data cluster in the multiple data clusters. Cluster related calculation helps search for an internal hidden link between clusters and avoids performing separate independent analysis on related data and ignoring an internal link between data of different clusters, causing that an analysis result based on these internal links cannot be obtained.

According to a second aspect, the determining whether the any several data clusters are related includes: determining that the any several data clusters are related if a second bias estimation of each data cluster in the any several data clusters is less than a first bias estimation of the data cluster. Herein, whether the any several data clusters are related is determined merely based on a relationship between the second bias estimation of each data cluster in the any several data clusters and the first bias estimation of the data cluster, so that whether the data clusters are related can be simply and fast determined.

According to a third aspect, the method 200 further includes: merging data clusters marked as related in the at least two data clusters into a data cluster. Herein, the data clusters marked as related are merged into a data cluster in advance, so that the data cluster is fast obtained in subsequent operations for analysis, and the quantity of clusters is reduced, thereby reducing a computation amount of subsequent data processing.

According to a fourth aspect, respective first neural network models of the at least two data clusters and the particular neural network model are neural network models of the same type. Herein, the respective first neural network models of the at least two data clusters and the particular neural network model are set to the same type, to improve detection accuracy of the related data clusters and unify the models. In this way, the classification method provided in this embodiment of the present invention and an original result obtained merely by means of a clustering method can be accurately compared and described.

Figure 3:
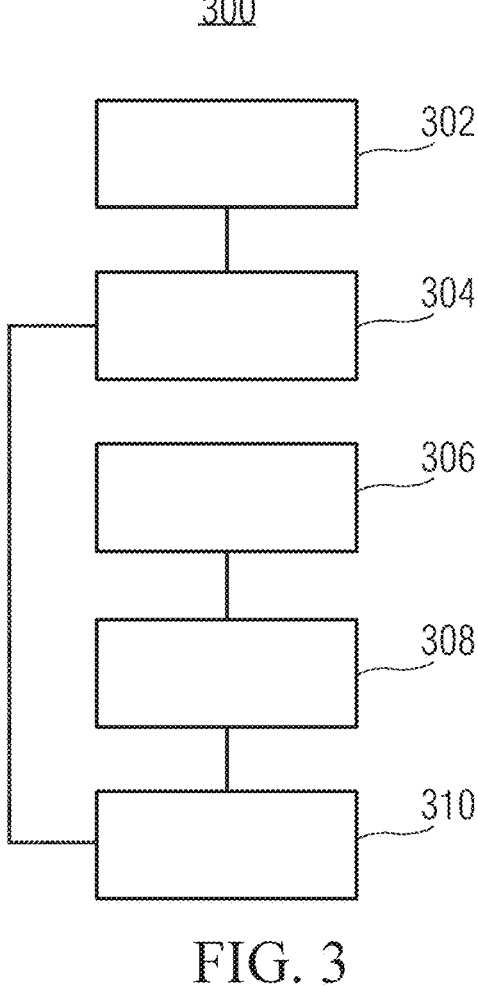
FIG. 3 is a schematic diagram of an apparatus for classifying data according to an embodiment of the present invention.

FIG. 3 is a schematic diagram of an apparatus for classifying data according to an embodiment of the present invention. The apparatus 300 shown in FIG. 3 may be implemented by using software, hardware (for example, an integrated circuit or digital signal processing (DSP)), and a combination of software and hardware. The apparatus 300 may be, for example, installed in any proper computation device having a computation capability.

As shown in FIG. 3, the apparatus 300 may include a first classification module 302, a first determining module 304, a second classification module 306, a second determining module 308, and a third determining module 310. The first classification module 302 is configured to classify at least two pieces of data, to obtain at least two data clusters. The first determining module 304 is configured to determine a bias degree of classification. The second classification module 306 is configured to re-classify the at least two pieces of data by merging any several of the at least two data clusters. The second determining module 308 is configured to determine a bias degree of re-classification. The third determining module 310 is configured to, determine, by comparing the bias degree of first classification and the bias degree of re-classification, which classification is more accurate.

According to a first aspect, the first determining module 304 is further configured to calculate respective first bias estimations of the at least two data clusters, where a first bias estimation of any data cluster of the at least two data clusters indicates a difference degree between the any data cluster and output data of a first neural network model of the any data cluster when the any data cluster is input to the first neural network model of the any data cluster, the first neural network model of the any data cluster is obtained through training by using data included in the any data cluster, and an input layer and an output layer of the first neural network model have the same quantity of nodes. The first determining module 304 may be implemented by, for example but not limited to, using operations in the boxes 106-114 in FIG. 1 and solutions described in the second and third paragraphs in other transformations. The second determining module 308 is further configured to: for any several data clusters selected from the at least two data clusters, calculate respective second bias estimations of the any several data clusters, where a second bias estimation of each data cluster in the any several data clusters indicates a difference degree between the data cluster and output data of a particular neural network model when the data cluster is input to the particular neural network model, the particular neural network model is obtained through training by using all data included in the any several data clusters, and an input layer and an output layer of the particular neural network model have the same quantity of nodes. The second determining module 308 may be implemented by, for example but not limited to, using operations in the boxes 122-130 in FIG. 1 and solutions described in the second and third paragraphs in other transformations. The third determining module 310 includes: a judgment module, configured to determine, based on respective first bias estimations and second bias estimations of the any several data clusters, whether the any several data clusters are related; and a marking module, configured to mark the any several data clusters as related when a determining result is positive. Herein, after the at least two pieces of data to be classified are classified to obtain the at least two data clusters, a neural network model is used to detect the data clusters to see whether there is a related data cluster in the data clusters and mark the related data cluster as related, so as to find out the related data cluster in the multiple data clusters. Cluster related calculation helps search for an internal hidden link between clusters and avoids performing separate independent analysis on related data and ignoring an internal link between data of different clusters, causing that an analysis result based on these internal links cannot be obtained.

According to a second aspect, the judgment module is further configured to determine that the any several data clusters are related if a second bias estimation of each data cluster in the any several data clusters is less than a first bias estimation of the data cluster. Herein, whether the any several data clusters are related is determined merely based on a relationship between the second bias estimation of each data cluster in the any several data clusters and the first bias estimation of the data cluster, so that whether the data clusters are related can be simply and fast determined.

According to a third aspect, the apparatus 300 further includes: a mergence module, configured to merge data clusters marked as related in the at least two data clusters into a data cluster. Herein, the data clusters marked as related are merged into a data cluster in advance, so that the data cluster is fast obtained in subsequent operations for analysis, and the quantity of clusters is reduced, thereby reducing a computation amount of subsequent data processing.

According to a fourth aspect, respective first neural network models of the at least two data clusters and the particular neural network model are neural network models of the same type. Herein, the respective first neural network models of the at least two data clusters and the particular neural network model are set to the same type, to improve detection accuracy of the related data clusters and unify the models. In this way, the classification method provided in this embodiment of the present invention and an original result obtained merely by means of a clustering method can be accurately compared and described.

Figure 4:
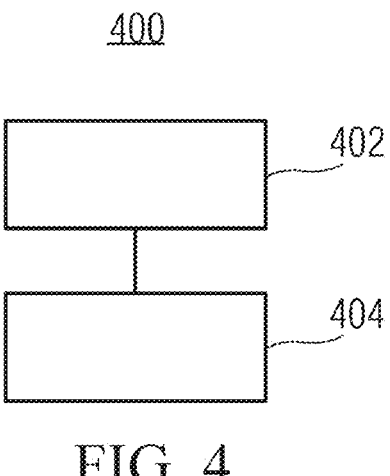
FIG. 4 is a schematic diagram of a computation device according to an embodiment of the present invention.

FIG. 4 is a schematic diagram of a computation device according to an embodiment of the present invention. As shown in FIG. 4, a computation device 400 may include at least one processor 402 and at least one memory 404. The at least one memory 404 is configured to store an executable instruction, causing the at least one processor 402 to perform the operations included in the method 100 or 200 when the executable instruction is executed.

An embodiment of the present invention further provides a machine readable medium, where an executable instruction is stored on the machine readable medium, and causes a processor to perform any one of the foregoing methods when the executable instruction is executed by the processor. Specifically, a system or an apparatus equipped with the machine readable medium may be provided, software program code for implementing functions of any one of the foregoing embodiments is stored on the machine readable medium, and a computer or processor of the system or apparatus is caused to read and execute a machine readable instruction stored in the machine readable medium.

In this case, program code read from the machine readable medium may implement functions of any one of the foregoing embodiments. Therefore, machine readable code and the machine readable medium storing the machine readable code constitute a part of the present invention.

Embodiments of the machine readable medium include a floppy disk, a hard disk, a magnetic optical disc, an optical disc (such as CD-ROM, CD-R, CD-RW, DVD-ROM, DVD-RAM, DVD-RW, and DVD+RW), a magnetic tape, a non-volatile memory card, and a ROM. Optionally, program code may be downloaded by a communications network from a server computer or a cloud.

An embodiment of the present invention further provides a computer program product. The computer program product is tangibly stored on a computer readable medium and includes a computer executable instruction, causing at least one processor to perform any one of the foregoing methods when the computer executable instruction is executed.

An embodiment of the present invention further provides a computer program, and the computer program includes a computer executable instruction, causing at least one processor to perform any one of the foregoing methods when the computer executable instruction is executed.

It should be noted that not all steps and modules in the foregoing processes and structural diagrams of systems are necessary, and some steps or modules may be omitted according to actual needs. Execution sequences of steps are not fixed and may be adjusted according to needs. System structures described in the foregoing embodiments may be physical structures or logical structures. That is, some modules may be implemented by the same physical entity, or some modules may be implemented by multiple physical entities, or some modules may be implemented by some components in multiple independent devices together.

In the foregoing embodiments, hardware units may be implemented in a mechanical manner or an electric manner. For example, a hardware unit may include a permanent dedicated circuit or logic (such as a dedicated processor, a FPGA, or an ASIC) to complete corresponding operations. The hardware unit may further include a programmable logic or circuit (such as a general purpose processor or another programmable processor) and may be temporarily set by software to complete corresponding operations. A specific implementation (a mechanical manner, or a dedicated permanent circuit, or a temporarily set circuit) may be determined based on consideration for costs and time.

The present invention is displayed and described in detail above by using the accompanying drawings and preferred embodiments. However, the present invention is not limited to these disclosed embodiments. A person skilled in the art would learn based on the foregoing multiple embodiments that more embodiments of the present invention may be obtained by combining code examination means in the foregoing different embodiments, and these embodiments also fall within the protection scope of the present invention.

What is claimed is:

1. A method for classifying data, the method comprising:
   first classifying at least two pieces of data to obtain at least two first data clusters;
   determining a first bias degree of the first classifying based on a plurality of first difference degrees, each of the plurality of first difference degrees being determined based on a difference between first output data and a respective first data cluster among the at least two first data clusters, the first output data being obtained by inputting the respective first data cluster into a corresponding first neural network model, and the corresponding first neural network model being among a plurality of first neural network models;

re-classifying the at least two pieces of data by merging at least two of the at least two first data clusters to obtain a second data cluster;

determining a second bias degree of the re-classifying based on a plurality of second difference degrees, each of the plurality of second difference degrees being determined based on a difference between second output data and a respective subset among subsets of data in the second data cluster, and the second output data being obtained by inputting the respective subset into a second neural network model; and determining which of the first classifying and the re-classifying is more accurate based on the first bias degree and the second bias degree.

2. The method of claim 1, wherein each respective first neural network model among the plurality of first neural network models is obtained through training by using data in a corresponding first data cluster among the at least two first data clusters;

an input layer and an output layer of each among the plurality of first neural network models have a same quantity of nodes;

the second neural network model is obtained through training by using all data included in the second data clusters;

an input layer and an output layer of the second neural network model have a same quantity of nodes; and the determining which of the first classifying and the re-classifying is more accurate includes determining related data clusters among the at least two first data clusters, and marking the related data clusters as related in response to the determining the related data clusters.

3. The method of claim 2, wherein the determining the related data clusters is based on the second bias degree being less than the first bias degree.

4. The method of claim 2, further comprising:

merging data clusters marked as related among the at least two first data clusters into a third data cluster.

5. The method of claim 2, wherein each among the plurality of first neural network models and the second neural network model are neural network models of a same type.

6. The method of claim 1, wherein each respective first neural network model among the plurality of first neural network models is trained as an auto encoder for a corresponding first data cluster among the at least two first data clusters; and the second neural network model is trained as an auto encoder for the second data cluster.

7. The method of claim 1, wherein the first output data has a same number of attributes as each respective first data cluster among the at least two first data clusters; and the second output data has a same number of attributes as each respective subset among the subsets of data in the second data cluster.

8. The method of claim 1, wherein an input layer and an output layer of each among the plurality of first neural network models have a same quantity of nodes; and an input layer and an output layer of the second neural network model have a same quantity of nodes.

9. A computation device, comprising:

at least one memory storing an executable instruction; and at least one processor configured to execute the executable instruction to cause the computation device to first classifying at least two pieces of data, to obtain at least two first data clusters, determine a first bias degree of the first classification based on a plurality of first difference degrees, each of the plurality of first difference degrees being determined based on a difference between first output data and a respective first data cluster among the at least two first data clusters, the first output data being obtained by inputting the respective first data cluster into a corresponding first neural network model, and the corresponding first neural network model being among a plurality of first neural network models, re-classify the at least two pieces of data by merging at least two of the at least two first data clusters to obtain a second data cluster, determine a second bias degree of the re-classification based on a plurality of second difference degrees, each of the plurality of second difference degrees being determined based on a difference between second output data and a respective subset among subsets of data in the second data cluster, and the second output data being obtained by inputting the respective subset into a second neural network model, and determine which of the first classification and the re-classification is more accurate based on the first bias degree and the second bias degree.

10. The computation device of claim 9, wherein each respective first neural network model among the plurality of first neural network models is obtained through training by using data in a corresponding first data structure among the at least two first data clusters;

an input layer and an output layer of each among the plurality of first neural network models have a same quantity of nodes;

the second neural network model is obtained through training by using all data included in the second data clusters;

an input layer and an output layer of the second neural network model have a same quantity of nodes; and the at least one processor is configured to execute the executable instruction to cause the computation device to determine which of the first classification and the re-classification is more accurate including determining related data clusters among the at least two first data clusters, and marking the related data clusters as related in response to the determining the related data clusters.

11. The computation device of claim 10, wherein the determining the related data clusters is based on;

the second bias degree being less than the first bias degree.

12. The computation device of claim 10, wherein the at least one processor is configured to execute the executable instruction to cause the computation device to merge data clusters marked as related among the at least two first data clusters into a third data cluster.

13. The computation device of claim 10, wherein each among the plurality of first neural network models and the second neural network model are neural network models of a same type.

14. The computation device of claim 9, wherein each respective first neural network model among the plurality of first neural network models is trained as an auto encoder for a corresponding first data cluster among the at least two first data clusters; and the second neural network model is trained as an auto encoder for the second data cluster.

15. The computation device of claim 9, wherein the first output data has a same number of attributes as each respective first data cluster among the at least two first data clusters; and the second output data has a same number of attributes as each respective subset among the subsets of data in the second data cluster.

16. A non-transitory machine readable medium storing an executable instruction that, when executed by a machine, causes the machine to:

first classify at least two pieces of data to obtain at least two first data clusters, determine a first bias degree of the first classification based on a plurality of first difference degrees, each of the plurality of first difference degrees being determined based on a difference between first output data and a respective first data cluster among the at least two first data clusters, the first output data being obtained by inputting the respective first data cluster into a corresponding first neural network model, and the corresponding first neural network model being among a plurality of first neural network models, re-classify the at least two pieces of data by merging at least two of the at least two first data clusters to obtain a second data cluster, determine a second bias degree of the re-classification based on a plurality of second difference degrees, each of the plurality of second difference degrees being determined based on a difference between second output data and a respective subset among subsets of data in the second data cluster, and the second output data being obtained by inputting the respective subset into a second neural network model, and determine which of the first classification and the re-classification is more accurate based on the first bias degree and the second bias degree.

17. The non-transitory machine readable medium of claim 16, wherein each respective first neural network model among the plurality of first neural network models is obtained through training by using data in a corresponding first data cluster among the at least two first data clusters;

an input layer and an output layer of each among the plurality of first neural network models have a same quantity of nodes;

the second neural network model is obtained through training by using all data included in the second data clusters;

an input layer and an output layer of the second neural network model have a same quantity of nodes; and the executable instruction when executed by the machine causes the machine to determine which of the first classification and the re-classification is more accurate including determining related data clusters among the at least two first data clusters, and marking the related data clusters as related in response to the determining the related data clusters.

18. The non-transitory machine readable medium of claim 17, wherein the determining the related data clusters is based on the second bias degree being less than the first bias degree.

19. The non-transitory machine readable medium of claim 17, wherein the executable instruction when executed by the machine causes the machine to merge data clusters marked as related among the at least two first data clusters into a third data cluster.

20. The non-transitory machine readable medium of claim 17, wherein each among the plurality of first neural network models and the second neural network model are neural network models of a same type.

* * * * *